United States Patent

[11] 3,598,452

| [72] | Inventors | Stanley Clifford<br>Coventry;<br>Leonard Ramsay Hiscox, Birmingham,<br>both of, England |
|---|---|---|
| [21] | Appl. No. | 727,469 |
| [22] | Filed | May 8, 1968 |
| [45] | Patented | Aug. 10, 1971 |
| [73] | Assignee | Girling Limited<br>Birmingham, England |
| [32] | Priority | May 23, 1967, Oct. 12, 1967, Feb. 8, 1968 |
| [33] | | Great Britain |
| [31] | | 23883/67, 46582/67 and 6223/68 |

[54] MEANS FOR CONTROLLING DECELERATION OF A WHEEL
5 Claims, 1 Drawing Fig.

[52] U.S. Cl. .................................................. 303/21 CG,
                                                        303/20
[51] Int. Cl. .................................................. B60t 7/02
[50] Field of Search ................................. 104/148,
        152; 246/182; 318/52; 303/20, 21 A4, 21 B, 21 BE,
                                        21BB, 21 CE, 21 CG

[56] References Cited
UNITED STATES PATENTS

| 3,026,148 | 3/1962 | Ruof | 303/21 BE |
| 3,245,727 | 4/1966 | Anderson et al. | 303/21 A4 |
| 3,398,995 | 10/1966 | Martin | 303/21 A4 |

Primary Examiner—Duane A. Reger
Attorney—Holmar & Stern

ABSTRACT: The acceleration or deceleration of a wheel on a rail vehicle is controlled by using the wheel to drive a generator which produces an electrical signal, the magnitude of which depends on the acceleration or deceleration of the wheel. This signal is applied to a DC control circuit which includes means operable to release the brakes if deceleration is being controlled, or to prevent transmission of driving power to the wheel if acceleration is being controlled. The control circuit includes a DC source charged by the generator and providing power to the control circuit, and the arrangement also includes a delay network for maintaining the circuit in a condition to release the breaks or prevent transmission of power in the event that the wheels should lock before the brakes are released or slip before the power is released.

PATENTED AUG 10 1971
3,598,452
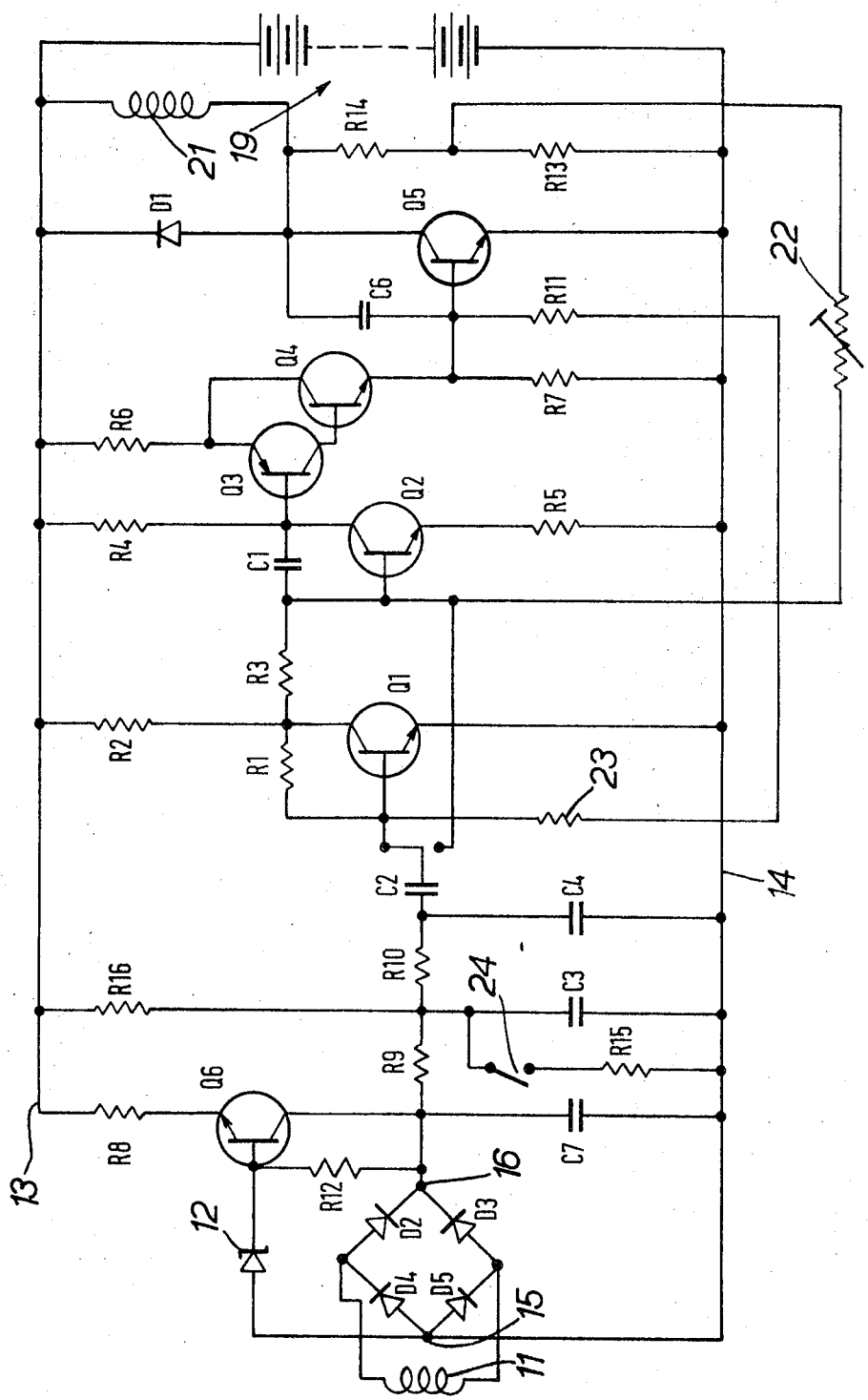
INVENTOR
G. Clifford et al
BY
ATTORNEYS

MEANS FOR CONTROLLING DECELERATION OF A WHEEL

This invention relates to means for controlling acceleration or deceleration of a wheel. The invention is particularly, but not exclusively intended for use with rail vehicles.

Means according to one aspect of the invention comprises a generator driven by the wheel, means for producing an electrical signal having a magnitude dependent on the deceleration of the wheel, a DC control circuit to which said signal is supplied, said control circuit including means operable in use to release the brakes applied to said wheel when the magnitude of said signal reaches a predetermined value, a DC source which is charged by said generator and provides power to said control circuit, and a delay network within said control circuit for maintaining the circuit in a condition to release the brakes in the event that the wheel should lock before the brakes are released.

In another aspect, the invention resides in means for controlling the acceleration of a wheel, comprising the generator driven by the wheel, means for producing an electrical signal having a magnitude dependent on the acceleration of the wheel, a DC control circuit to which said signal is supplied, said control circuit including means operable in use to prevent transmission of driving power to said wheel when the magnitude of said signal reaches a predetermined value, a DC source which is charged by said generator and provides power to said control circuit, and a delay network within said control circuit for maintaining the circuit in a condition to prevent supply of power to said wheel in the event that the wheel should start to slip before said power is released.

One example of the invention is illustrated in the accompanying circuit diagram.

The example to be described relates to brake control means intended for use on a rail vehicle, where each of the four wheels of the rail vehicle has associated therewith a self-contained unit for controlling the braking effort applied to the wheel. Since the arrangement for each wheel is the same, only one arrangement will be described.

The wheel drives an alternator illustrated diagrammatically at 11, and the output from the alternator 11 is fed to the input terminals of the full wave bridge rectifier including diodes D2, D3, D4, D5. The bridge has output terminals 15, 16, the terminal 15 being connected to a supply line 14 and the terminal 16 being connected to a supply line 13 through the collector and emitter of an NPN transistor Q6 having a resistor R8 in its emitter circuit. The terminal 16 is further connected to the base of the transistor Q6 through a resistor R12, and the base of the transistor Q6 is connected to the terminal 15 through a Zener diode 12. The terminal 16 is connected to the line 14 through a capacitor C7. The lines 13, 14 are bridged by a DC source 19, conveniently in the form of a number of nickel-cadmium secondary cells.

The circuit further includes an NPN transistor Q1 having its emitter connected to the line 14 and its collector connected to the line 13 through a resistor R2. The collector and base of the transistor Q1 are interconnected through a resistor R1, and the collector is further connected through a resistor R3 to the base of an NPN transistor Q2, the emitter of which is connected to the line 14 through a resistor R5 and the collector of which is connected to the line 13 through a resistor R4. The collector and base of the transistor Q2 are interconnected through a capacitor C1, and the collector is further connected to the base of a PNP transistor Q3, the emitter of which is connected to the line 13 through a resistor R6 and the collector of which is connected to the base of an NPN transistor Q4 having its collector connected to the line 13 through the resistor R6 and its emitter connected to the line 14 through a resistor R7. The emitter of the transistor Q4 is further connected to the base of an NPN transistor Q5 having its emitter connected to the line 14, its collector connected to the line 13 through a solenoid 21 bridged by a diode D1, and its collector and base interconnected through a capacitor C6. A pair of resistors R14, R13 are connected in series across the collector-emitter of the transistor Q5, and the junction of the resistors R14, R13 is connected to the base of the transistor Q2 through a preset resistor 22. The base of the transistor Q5 is further connected through a resistor R11 and a thermistor 23 in series to the base of the transistor Q1.

An input to the base of the transistor Q1 is provided from the terminal 16 by way of resistors R9, R10 and a capacitor C2 in series. The junction of the resistors R9, R10 is connected to the line 13 through a resistor R16 and to the line 14 through a capacitor C3, which is bridged by a normally open switch 24 and a resistor R15 in series. The junction of the resistor R10 and capacitor C2 is connected to the line 14 through a capacitor C4, and as will be explained later, the capacitor C2 can be connected to the base of the transistor Q2 instead of to the base of the transistor Q1.

The alternator produces an output which is dependent on speed, and this output is passed through the transistor Q6 and its associated components which act in known manner to provide a constant current to the lines 13, and to charge the battery 19. The resistors R9, R10 and capacitors C7, C3, C4 act as a smoothing network, and the smoothed output is passed through the capacitor C2 to the base of the transistor Q1, so that a signal appears at the base of the transistor Q1 only when the wheel is accelerating or decelerating. The signal will be negative with respect to the line 14 when the wheel is decelerating, but positive with respect to the line 14 when the wheel is accelerating. A signal which is positive with respect to the line 14 has no effect with the capacitor C2 connected to the base of the transistor Q1 as shown, and so acceleration signals can be ignored.

Assuming that the rail vehicle is not decelerating, and the transistor Q1 is maintained conductive by current flow through resistors R2, R1, and so removes part but not all of the base current from the transistor Q2. Conduction of the transistor Q2 turns on the transistor Q3, which in turn causes conduction of the transistor Q4 which provides base current to the transistor Q5, so that all the transistors are conducting. However, the circuit values are such that the current flowing through the transistor Q5 to the solenoid 21 is insufficient to energize the solenoid 21.

When the brakes of the rail vehicle are applied so that the wheel decelerates, a negative signal having a magnitude dependent on the deceleration passes through the capacitor C2 and tends to turn the transistor Q1 off, so that more current can flow through the resistor R3, and the transistors Q2, Q3, Q4 and Q5 all conduct more. The amount by which the transistor Q2 conducts is determined by the value of the resistor 22, which provides an alternative path for current flowing through the resistor R3. The value of the resistor 22 is set on manufacture so that when a predetermined signal passes through the capacitor C2 representing a condition in which the wheels are close to locking, then the transistor Q5 will conduct sufficiently to energize the solenoid 21. The solenoid 21 is connected in the braking system in any convenient manner so that when it is energized it releases the brakes.

It will be appreciated that the arrangement described actually anticipates locking of the wheels, so that in theory the brakes will be released actually before the wheel locks. However, in practice there is inevitably a delay between the receipt of the signal through the capacitor C2, and the release of the brakes by energization of the solenoid 21. During this delay period, it is possible for the wheels to lock, and if this happens the wheel will of course cease to decelerate so that no further signal will pass through the capacitor C2, and if no steps were taken the brakes would not be released. The capacitor C1 is provided to overcome this difficulty. When the transistor Q1 turns off, the capacitor C1 is discharged. In the event that the wheels lock so that the transistor Q1 turns on again, then the collector of the transistor Q1 will fall towards the potential of the line 14, so reducing the base current of the transistor Q2 with the resultant possibility that the solenoid 21 will be deenergized. In the circumstances the capacitor C1 charges through the base and emitter of the transistor Q2, the resistor R5, the resistors R13, R14, the solenoid 21 and the resistor R4, so holding the transistor Q2 conductive for a predetermined period of time. As long as the transistor Q2 is conducting, the transistors Q3, Q4 and Q5 will also be conducting and the solenoid will remain energized, and so in this way the arrangement ensures that the brakes will be released even if the wheel should lock before the actual release takes place.

If it is desired to use the circuit to control acceleration of the wheel, the capacitor C2 is connected to the base of the transistor Q2 instead of to the base of the transistor Q1. A negative signal passed through the capacitor C2 during deceleration now tends to turn the transistor Q2 off, but this does not matter because reduction in current through the transistor Q2 will only result in a reduction in current through transistors Q3, Q4, and Q5, and so a reduction in current through the solenoid 21, which in any case was not energized. However, when the wheel is accelerating, a positive signal is applied to the base of the transistor Q2 tending to cause it to conduct more. At a predetermined acceleration which is chosen by selection of the resistor 22 to be just before the wheel is liable to slip, the transistor Q2 will conduct sufficiently to cause the transistor Q5 to supply sufficient current to the solenoid 21 to energize it. The solenoid, when energized, operates any convenient mechanism for preventing the driver of the rail vehicle from increasing the power supplied to the wheel further. The capacitor C1 has exactly the same function in this operation as when the wheel is decelerating.

The switch 24 is provided to enable the circuit to be tested. Thus, when the switch 24 is closed, it provides a signal through the capacitor C2 representing acceleration of the wheel. This signal has no effect, but when the switch 24 is open again, it supplies a signal which is equivalent to a deceleration signal, so that the solenoid 21 should be momentarily energized. It will be noted that the position of the switch 24 is such that no separate source is required for testing the arrangement, the power being supplied by the battery 19. Furthermore, the important parts of the circuit will be tested even if the battery 19 is partly discharged, and so the risk of the solenoid not operating as a result of inadequate battery voltage, with consequential false diagnosis of circuit failure, is minimized. The switch 24 is preferably magnetically operated and the arrangement is such that normally the switch is magnetically screened from an adjacent magnet by a ferrous screen. When carrying out a test, the screen is momentarily moved out of its normal position, for example by a pushbutton, and so the switch comes under the influence of the magnet and closes. Releasing the switch button then allows the screen to return so that the switch reopens. The switch could, however, be normally closed and opened by a magnet. Obviously many other forms of switch can be used.

The thermistor 23 in the base circuit of the transistor Q1 serves in conjunction with the resistor R11 to compensate for temperature changes.

The entire circuit shown can be fitted within the axle box of the wheel, and forms a convenient self-contained unit. The self-power arrangement is particularly useful on vehicles having no power supply, but is also useful on vehicles with a power supply, because there are wide variations in the nominal voltage of the supply in such vehicles, and between the voltages used by different railway companies, and self-powered unit permits complete standardization. Difficulties resulting from interference from other supplies (e.g. fluorescent lamps) are also avoided.

Although it is preferred to use a DC source in the form of a battery 19, the battery can, in certain examples, be replaced by a capacitor which acts as the DC source.

It is of course only necessary to provide one unit of the form described for each axle on a rail vehicle, even though the axle has two wheels on it. If the axles on a rail vehicle are coupled, as is the case in some vehicles, then of course expense can be saved by fitting a unit to one only of the axles. Moreover, even when the axles are not coupled, expense may be saved if desired, by using a single control unit on one of the axles and releasing the braking part from all the axles simultaneously. In such an arrangement, signals would be obtained from all the axles, so that if any one of the wheels started to skid, the brakes would be released from all the axles.

The capacitor C6 is included to ensure that the negative feedback applied by way of R13, 22, R11 and 23 does not produce instability.

Having thus described our invention that we claim as new and desire to secure by Letters Patent is:

1. Means for controlling the deceleration of a wheel having brakes comprising: a generator driven by the wheel; signal producing means for producing an electrical signal having a magnitude dependent upon the deceleration of the wheel; DC control circuit means coupled to said signal-producing means, said control circuit means including brake release means energized in response to said signal to effect release of the brakes applied to the wheel when the magnitude of said signal reaches a predetermined value; a delay network means within said control circuit means for maintaining the energization of said brake release means for a predetermined period of time upon locking of the wheel before the brakes are reapplied a DC source coupled to said control circuit for providing power thereto; and means coupling said DC source to said generator for charging said DC source.

2. Means as claimed in claim 1 in which the means for producing said electrical signal comprises an alternator driven by the wheel and having associated therewith a full wave rectifier, the alternator serving also to charge said DC source.

3. Means according to claim 2 in which the DC source is a secondary battery.

4. Means according to claim 3 in which the DC source is a capacitor.

5. Means according to claim 1 including a switch forming part of said control circuit and operable to test the circuit, the power for testing the circuit being provided by said DC source.